UNITED STATES PATENT OFFICE 2,451,772

SOLUBILIZATION OF RUTIN WITH METHYL-GLUCAMINE

Mikhail B. Plungian, Philadelphia, Pa., assignor to Temple University, Philadelphia, Pa., a corporation of Pennsylvania No Drawing. Application December 27, 1946, Serial No. 718,889

3 Claims. (Cl. 167—65)

The present invention relates to compositions having high therapeutic value and in particular is concerned with a new complex and its production which is especially useful in the treatment of capillary fragility and hypertension. The basic compound of the present invention may be represented by the following formula:

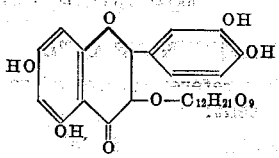

The above formula is for a compound recognized in the art as rutin which is known to be efficacious in the treatment of hypertension, capillary fragility and has recently been found to decrease blood coagulation time. The beneficial effects of rutin in the uncombined state are extremely slow principally due to its low blood stream solubility and its slow absorption from the intestinal tract. Recognizing that rutin is relatively insoluble, particularly in water at room temperature, the art has attempted in the past to seek new salts and complexes which possess the desired solubility and also have the desired therapeutic value of rutin.

It is well understood, of course, that inorganic alkalies such as caustic soda will overcome the solubility problem of numerous compounds but the final product particularly as far as rutin is concerned is not satisfactory for either hypodermic or oral administration due to its high alkalinity and resulting discomfiture to a subject undergoing treatment. Various other suggestions have been tried to increase the solubility of rutin but have been rejected primarily because of their deleterious effect on the therapeutic properties of rutin. In the research investigation which developed the present invention various inorganic salts were used for combinations but either have not produced the degree of solubility desired or have been found to be unsuitable for oral or hypodermic administration. The investigation has established that as a class amines including the alkanolamines are unfit for solubilizing the compound of the present invention but has proved that methyl-glucamine in proper admixture with rutin provides the desired solubility and that the final rutin complex or compound can be administered orally, intravenously, intra-muscularly or subcutaneously and with equal facility.

Rutin is a flavonol, a rhamno-glucoside of quercetin. It has been obtained as light yellow needles, melting at 188 to 192° C. according to Merck's Index. References to rutin in the literature go back as far as a report by Weiss made in 1842 followed by later reports of Schunck in 1888 and Attree and Perkin in 1927. Rutin has been obtained from the tobacco plant, fresh blossoms of hydrangea, forsythia, elder flowers, *Rhamnus utilis, Ruta gravaveolens* and other plant sources, but recent reports indicate that green buckwheat, particularly buckwheat meal leaf 26 days old, is the best source for this material and it is understood that rutin has been produced from the buckwheat source, first by pilot plant production, and now on commercial scale. It is known that rutin is practically insoluble in cold water having a .013% solubility in cold water and is also practically insoluble in ether, chloroform or benzene but is soluble in boiling water, however, the rutin crystallizes out upon cooling. Rutin is also soluble in boiling alcohol or alkalies. Reference may be made to Science, February 15, 1946, vol. 103, No. 2668, page 157–198 for more detailed information on the characteristics of rutin.

Rutin has been found not to be toxic to animals or humans even when used over extended periods of time, as upwardly of a year or more. This product has proved extremely beneficial in the treatment of hypertension and capillary fragility but because of its insolubility the reaction of a subject being treated with rutin is extremely slow as pointed out by J. O. Griffity, M. A. Lindaur, R. L. Shanno, J. F. Couch in a paper presented July 1–5, 1946, before the American Medical Association, San Francisco, and an article by R. L. Shanno in the American Journal of Med. Science, 1946, pages 539–543, and also by S. D. Kushlan—Gastroenterology, 1946, pages 199–212.

The present invention is directed specifically to a compound or complex of rutin with methyl-glucamine preferably in the proportion of three parts of rutin to one part of methyl-glucamine. The present product is stable and possesses the desired characteristics at various concentrations for hypodermical or oral administration. The product also retains the essential therapeutic properties of rutin but due to the high solubility characteristics of the rutin and methyl-glucamine compound beneficial results have been noted after administration of the present product for much shorter periods than rutin alone.

The present invention can be illustrated by the following method of preparation of the rutin compound or complex, and although the method may vary in details the general method disclosed below has been found effective in obtaining substantial yields of the rutin methyl-glucamine product.

One tenth M or 66.400 grams of rutin was dissolved in 500 cc. of boiling ethyl alcohol. When the rutin was completely dissolved, 25 grams of methyl-glucamine was added, and the mixture boiled on a steambath under reflux condenser for one hour. Half of the alcohol was then distilled off; the flask cooled, and one volume of anhydrous ether added, a light yellow precipitate formed which was then filtered in vacuum and the precipitate washed several times with the anhydrous ether. The precipitate was then dried in a vacuum dessicator, this furnished a crystalline yellow powder approximately of the depth reported in "Identification of Pure Organic Compounds," Mulliken, vol. 3, Commercial Dyestuffs, Chart A and Normal Tones, by reference, rutin had a color of Gy, tint 2.

The following chart will serve to illustrate the comparative solubility of rutin with the new product rutin methyl-glucamine:

| Determination | Rutin | Rutin Methyl-Glucamine |
|---|---|---|
| C % | 53.11 | 49.25 |
| H % | 4.96 | 6.82 |
| N % |  | 2.23 |
| M. P., °C | 195 | 105 |
| pH Values | | |
| 1%, boiling H₂O | 6.8-7 |  |
| 1%, water room temp |  | 8.6 |
| 5%, water room temp |  | 8.68 |
| 10%, water room temp |  | 8.68 |

The solubility of the new product rutin methyl-glucamine in water at room temperature is about 20% and it will be seen from the above chart that the pH value is well suited for hypodermical and oral administration.

Like rutin, itself, the new product rutin methyl-glucamine has been found after numerous experiments to be non-toxic in animals. This has been determined by prolonged and continuous intravenous and other modes of administration of rutin methyl-glucamine in animals, such as rabbits and mice.

What I claim and desire to protect by Letters Patent is:

1. A therapeutic product consisting of a methyl-glucamine complex of rutin characterized by its high degree of stability and high therapeutic value and non toxicity.

2. A therapeutic product consisting essentially of an aqueous solution of a complex of rutin and methyl-glucamine, said solution being stable and characterized by high therapeutic value.

3. A product of high stability and therapeutic value which is non-toxic and consisting of a complex of rutin and methyl-glucamine prepared in the proportions of approximately three parts rutin and one part methyl-glucamine.

MIKHAIL B. PLUNGIAN.

REFERENCES CITED

The following references are of record in the file of this patent:

UNITED STATES PATENTS

| Number | Name | Date |
|---|---|---|
| 2,161,114 | Volwiler | June 6, 1939 |
| 2,233,419 | Moore | Mar. 4, 1941 |

OTHER REFERENCES

Griffith et al., Proc. Soc. Exptl. Biol. Med., vol. 55, pages 228–9, (March 1944).